2 Sheets--Sheet 1.

L. J. MARCY.

Magic-Lanterns.

No. 5,638. Reissued Oct. 28, 1873.

Attest;
Ch. Davidson,
Baltis & Long.

Inventor;
L. J. Marcy
by his Atty
Wm. D. Baldwin

AM. PHOTO-LITHOGRAPHIC Co. N.Y. (OSBORNE'S PROCESS)

2 Sheets--Sheet 2.

L. J. MARCY.

Magic-Lanterns.

No. 5,638. Reissued Oct. 28, 1873.

Attest;
E. C. Davidson.
Baltis D. Long.

Inventor;
L. J. Marcy
by his Atty
W. D. Baldwin

AM. PHOTO-LITHOGRAPHIC CO. N.Y. (OSBORNE'S PROCESS)

UNITED STATES PATENT OFFICE.

LORENZO J. MARCY, OF PHILADELPHIA, PENNSYLVANIA.

IMPROVEMENT IN MAGIC LANTERNS.

Specification forming part of Letters Patent No. 92,330, dated July 6, 1869; reissue No. 5,638, dated October 28, 1873; application filed May 31, 1873.

*To all whom it may concern:*

Be it known that I, LORENZO JAMES MARCY, formerly of Newport, Rhode Island, but now of Philadelphia, Pennsylvania, have invented certain new and useful Improvements in Magic Lanterns, of which the following is a specification:

This invention relates to certain improvements on the magic lantern for which Letters Patent No. 77,300 were granted to me April 28, 1868, which improvements are intended to prevent the overheating of the lantern; to insure a bright, steady light from an oil-lamp without the use of a glass chimney; to render it easy to hold it in place; and to insert and remove it without lifting the lantern; also, to render the objective tube removable. The subject-matter claimed is hereinafter specified.

Figure 1:
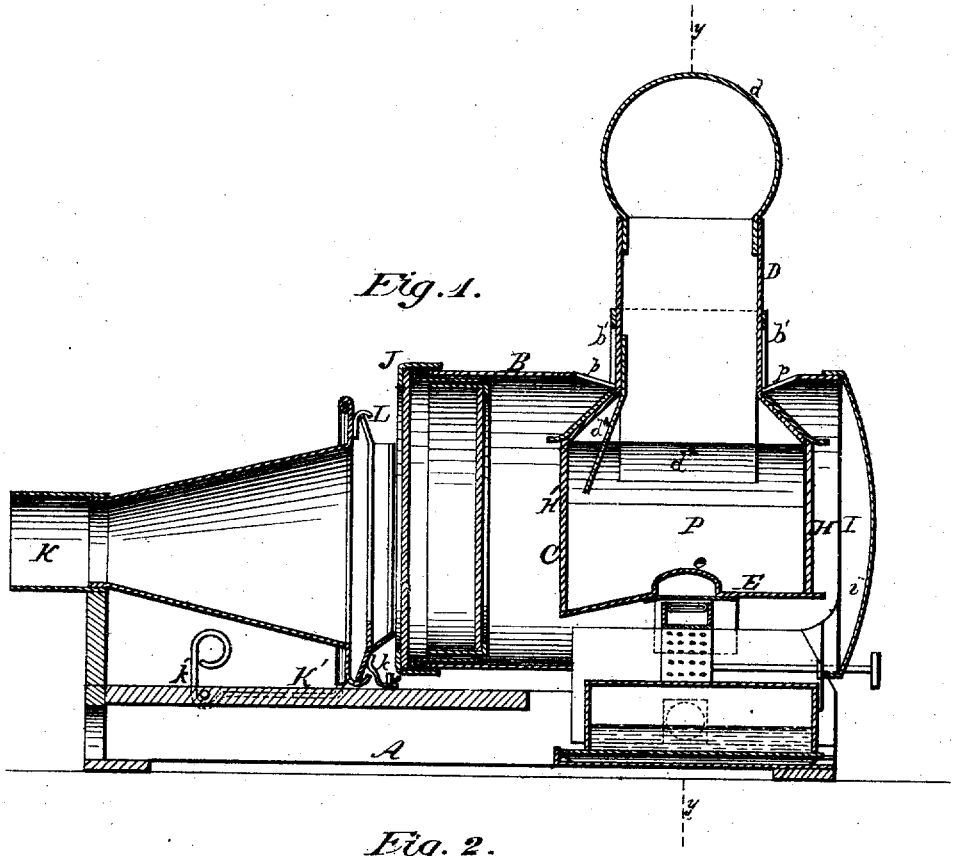
Figure 2:
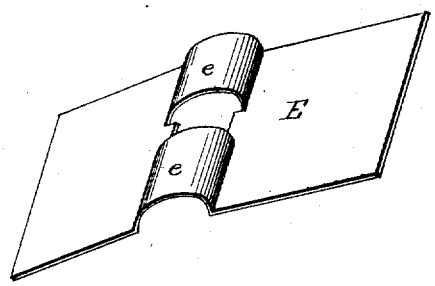
Figure 3:
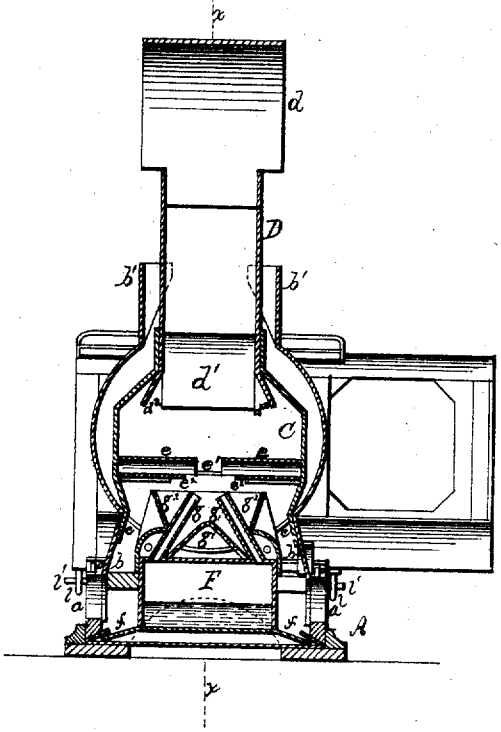
Figure 4:
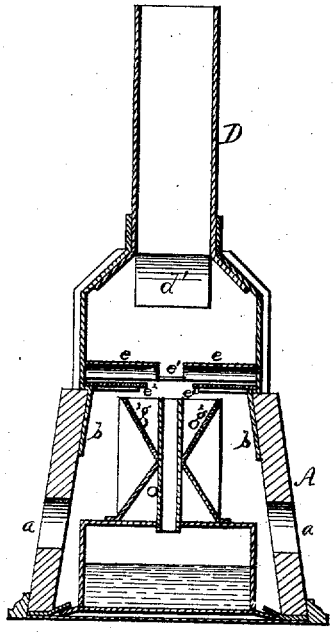

In the accompanying drawings, Figure 1 represents a vertical longitudinal central section through my improved lantern, on the line *x x* of Fig. 3; Fig. 2, a view in perspective of the bottom plate of the lamp-chamber detached; Fig. 3, a vertical transverse section of the lantern, on the line *y y* of Fig. 1; Fig. 4, a similar section through a modified form of lantern.

The base or support of the lantern consists of an open box or trough, A, with holes *a* in its sides to admit air. The outer shell or cylinder B is connected with the sides of this trough by flaps *b;* has openings in its under side, as hereinafter explained; and is cylindrical, or nearly so, in form, and has an opening in its upper side, from the edges of which flanges *b'* project. The inner shell C is of cylindrical or polygonal cross-section, and much shorter than the outer shell, with which it is connected at the bottom only by suitable lugs or flanges *c*, being unconnected at its ends, an air-space being left between the two, as shown in Fig. 3. A chimney, D, provided with a hood, *d*, leads from the lamp-chamber up through the outer shell without obstructing the air-space between the two shells, the chimney being connected with the flanges *b'* only of the outer shell, thus avoiding overheating the lantern. A downwardly-projecting outwardly-inclined plate, $d^1$, on the lower end of the chimney, serves to protect the lens from heat, while outwardly-flaring flanges $d^2$ serve to deflect the products of combustion into the chimney, thus protecting the walls from overheating. The floor or bottom of the inner shell is covered by a deflector-plate, E, having a central ridge, *e*, and a slot, $e^1$, in said ridge, for a purpose hereinafter explained. The space below this plate forms a chamber, in which a lamp-cup, F, slides on suitable ways *f*, as shown in Fig. 3. An opening in the end of the base A allows the lamp to be inserted or removed without moving the lantern or removing the deflector-plate. This lamp is so designed as to avoid the necessity of attaching either chimney or cone to it, two flat inwardly-inclined wick-tubes, *g*, being arranged upon the oil-font, with a gauze cone, $g^1$, between them, to prevent flickering, and outwardly-inclined gauze shields $g^2$ on each side of them for the same purpose. When in place, the wicks of the lamp approach closely to wire-gauze screens, $e^2$, arranged below the plate E, to prevent its becoming overheated, and the flame rises up through the slot in the deflector-plate, giving a clear, steady light. The slotted ridged plate serves as a cone. The back of this plate, it will be observed, is horizontal, to admit of the insertion of the lamp, while its front slopes downward and forward, to avoid shading the lenses. A small space is left between the deflector-plate and the top of the wick-tubes to prevent the conduction of heat. A glass, H, in the rear end of the inner shell, protects the reflector I from the heat, a space, *i*, being left between them, through which air rises. A similar glass, H', closes the front end of the flame-chamber P. The condensing-lenses are connected with the outer shell by a flanged cap, J, in a way similar to that shown in my former patent, and need not, therefore, be particularly described here. It will be observed, however, that the arrangement shown in the drawings leaves an air-space between the glasses H H' of the flame-chamber P, and the reflector and lenses, thus preventing the cracking of the latter. The air which rises through the spaces just mentioned escapes through openings *p* in the outer shell. The objective tube K and slide-frame L are likewise constructed in a manner similar to that shown in the aforesaid patent, but are connected to the base in a manner somewhat different, an eye, *l*, on one side of the tube-plate K' hooking over a pin, *l'*, on the base, while the other side of the plate is held by a spring-hook, $k'$, fitting over a pin. The range of motion of the slide-plate L is limited by a lug, $k$, on it, which abuts against stop-pins on the base, thus holding the slide-plate properly in line with the lenses.

Fig. 4 shows a lantern more especially adapted for signal service, having a higher base, and dispensing with the outer shell, one of the condensing-lenses, the objective tube, and slide-plate; the double shell may, however, advantageously be used with such a lantern.

I claim—

1. In a magic lantern, an outer case constructed substantially as described, with an opening through its top for the passage of the chimney, and with flanges attached to the chimney, forming the only connection between the two, to prevent overheating and leave an air-space between the case and chimney, as set forth.

2. The combination, substantially as set forth, of the outer case and its flanges with the inner case and its chimney, whereby the inner case is attached to the outer one above the flame-chamber through the medium of the flanges only, for the purposes specified.

3. The combination, substantially as described, of the open base, the open-bottomed tubular outer case, elevated above the base and connected thereto by short side flaps only, and the open-bottomed inner case, connected to the outer case by side flaps, to afford a firm support to the inner case, prevent overheating, and leave an air-space between the cases, as set forth.

4. The construction of a case, substantially as set forth, with a slotted diaphragm or deflector-plate, dividing it into a lamp-chamber and flame-chamber.

5. The combination, substantially as set forth, of a case, a slotted diaphragm or deflector-plate, and a lamp (without chimney or cone) sliding under said diaphragm or deflector-plate.

6. The combination, substantially as set forth, of the flame-chamber, the chimney, and its deflecting-flanges, for the purposes specified.

7. The combination, substantially as set forth, of the lamp, the ribbed slotted diaphragm or deflector-plate, and the perforated metal screens under said ribbed portion of the lamp, to secure a bright, steady flame.

8. The construction, as set forth, of the base, the outer case, and the inner case with openings in their ends, constituting a lamp-chamber.

9. The base constructed as described, with guides or ways in which the lamp-case slides and is held.

10. The connection of the objective tube and base by means of pins $l'$, loops $l$, and a spring-hook, $k'$, substantially as set forth.

11. The flame-chamber having glass ends, arranged so that an air-passage having an outlet, $p$, is left between the front glass H′ and the lens-tube.

12. In a magic lantern, a flame-chamber constructed substantially as hereinbefore set forth, with opaque walls and transparent ends, and with openings for entrance of air and for the escape of the heated products of combustion, whereby a clear, steady flame is obtained without the use of a glass chimney.

L. J. MARCY.

Witnesses:
JOE I. PEYTON,
E. C. DAVIDSON.